United States Patent [19]
Casada et al.

[11] Patent Number: 5,487,302
[45] Date of Patent: Jan. 30, 1996

[54] METHOD AND SYSTEM FOR MEASURING GATE VALVE CLEARANCES AND SEATING FORCE

[75] Inventors: Donald A. Casada; Howard D. Haynes, both of Knoxville; John C. Moyers, Oak Ridge; Brian K. Stewart, Burns, all of Tenn.

[73] Assignee: Lockheed Martin Energy Systems, Inc., Oak Ridge, Tenn.

[21] Appl. No.: 396,092

[22] Filed: Feb. 28, 1995

Related U.S. Application Data

[63] Continuation of Ser. No. 24,143, Mar. 1, 1993, abandoned.

[51] Int. Cl.$^6$ .................................................. F16K 37/00
[52] U.S. Cl. .................................................. 73/168
[58] Field of Search ............................ 73/4 R, 86, 168, 73/761; 33/654; 137/1; 251/129.11, 129.04, 129.12

[56] References Cited

U.S. PATENT DOCUMENTS

| | | |
|---|---|---|
| Re. 233,649 | 7/1991 | Kawai .................. 251/129.04 |
| 4,274,438 | 6/1981 | LaCoste . |
| 4,313,529 | 2/1982 | Kato et al. ............ 251/129.04 |
| 4,805,657 | 2/1989 | Carman et al. . |
| 4,844,110 | 7/1989 | Palsey . |
| 4,915,074 | 4/1990 | Arai .................... 251/129.11 |
| 5,029,597 | 7/1991 | Leon . |
| 5,137,257 | 8/1992 | Tice . |
| 5,156,373 | 10/1992 | Boyles et al. ......... 251/129.04 |
| 5,224,512 | 7/1993 | Nogami et al. ....... 251/129.11 |
| 5,239,874 | 8/1993 | Hale .................... 73/168 |

FOREIGN PATENT DOCUMENTS 0287299  10/1988  European Pat. Off. .

*Primary Examiner*—Robert Raevis
*Attorney, Agent, or Firm*—E. A. Pennington; J. M. Spicer; H. W. Adams

[57] ABSTRACT

Valve clearances and seating force, as well as other valve operational parameters, are determined by measuring valve stem rotation during opening and closing operations of a translatable gate valve. The magnitude of the stem rotation, and the relative difference between the stem rotation on opening and closing provides valuable data on the valve internals in a non-intrusive manner.

22 Claims, 7 Drawing Sheets

METHOD AND SYSTEM FOR MEASURING GATE VALVE CLEARANCES AND SEATING FORCE

This invention was made with Government support under contract DE-AC05-840R21400 awarded by the U.S. Department of Energy to Martin Marietta Energy Systems, Inc. and the Government has certain rights in this invention. This is a continuation of application Ser. No. 08/024,143, filed on Mar. 1, 1993, now abandoned.

FIELD OF THE INVENTION

The present invention relates generally to measuring and testing and, more specifically, to a system for measuring gate valve clearances and seating force in a motor operated valve. A sensor or other means is used to measure angular movement of the valve stem, and these movements are correlated to certain conditions of the valve.

BACKGROUND OF THE INVENTION

Gate valves, and particularly motor-operated and air-operated gate valves are used extensively within nuclear power plants and process industries for the purpose of controlling fluid flow. The function of a gate valve is to provide positive flow isolation in fluid systems. Gate valves with motor- and air-operators (as well as other types of power operators) are used in critical safety-related functions in which the valves are automatically closed (or opened in some cases) in response to emergency conditions in order to ensure that the plant can be safely shutdown and accidents effectively mitigated.

In recent years, a variety of problems with motor-operated gate valves in particular has led to substantial expenditures by utilities, as well as the Nuclear Regulatory Commission (NRC), in efforts to ensure that these gate valves can be seated (or opened) under accident conditions. Two of the particular parameters of concern in making the determination of the valve's ability to function as required are internal clearances and delivered thrust. Various valve dimensions and clearances, such as the gate valve guide to disk clearance, T-bar to disk clearance, and the seat vs. guide limited angles are critical to successful valve performance. The thrust delivered to the disk by the operator through the stem is also critical to successful valve performance.

A wide variety of valve and valve operator problems have been documented. Probably the most visible issues have been addressed in the various revisions of NRC Bulletin 85-03, and in NRC Generic Letter 89-10, which deal with motor-operated valve (MOV) problems, and requires utilities to take actions to ensure that their MOVs will function as required. While the level of attention given to MOVs has been high, some of the same considerations apply to valves powered by other types of operators.

It is thus in the interest of the utility, and to the general public, that gate valves be monitored for degradation due to service wear. A continuing need exists for a reliable method and system for carrying out such monitoring so as to provide information on clearances, wear and developed thrust for valves used in critical safety-related applications, without requiring disassembly or other intrusive monitoring.

U.S. Pat. No. 5,029,597 to Leon describes a controller for a motor operated valve (MOV) in which a strain gauge is placed on the yoke of the valve. The strain gauge measures valve stem load and a monitor determines the rate of change of the stem load. When the rate of change reaches a threshold value, the motor is shut off to avoid overloading.

U.S. Pat. No. 4,844,110 to Paley describes a MOV having an overload sensor which measures current through the valve motor and controls operation of the motor in response to the sensed motor current.

European Patent Application No. 0 287 299 A2 describes a MOV diagnostic system which includes a sensor for determining valve stem position as it translates up and down. Actual and predicted positions are compared, as are actual stem load and predicted stem load.

None of the above-noted references provides an adequate system for determining, on a non-intrusive basis, seating force and/or degradation of a MOV, as reflected in gate valve clearances.

SUMMARY OF THE INVENTION

An object of the present invention is to provide a system for measuring gate valve clearances and seating force in a motor operated valve, which is capable of identifying valves having improper settings or are degraded to the point of needing repair or replacement.

Another object of the present invention is to provide a system for measuring gate valve clearances and seating force in a motor operated valve, which is capable of indicating a variety of valve condition parameters, such as valve clearances, developed thrust, frictional loads, and other critical features of the valve and its operator.

Still another object of the present invention is to provide a method for measuring gate valve clearances and seating force in a motor operated valve which relies on valve stem rotation measurements and correlates same to a certain condition of the valve.

These and other objects of the invention are met by providing a system for determining operative conditions of a valve having a gate valve element fixedly connected to a valve stem, said valve stem being driven for translatory motion by a rotatable stem nut, the system comprising sensor means for producing a signal indicative of valve stem rotation, and monitor means, coupled to receive the signal from the sensor means, for indicating changes in the valve rotation signal, said changes corresponding to different operative conditions of the valve.

Other objects, advantages and salient features of the invention will become apparent from the following detailed description, which taken in conjunction with the annexed drawings, discloses preferred embodiments of the invention.

DETAILED DESCRIPTION OF THE INVENTION

Figure 1:
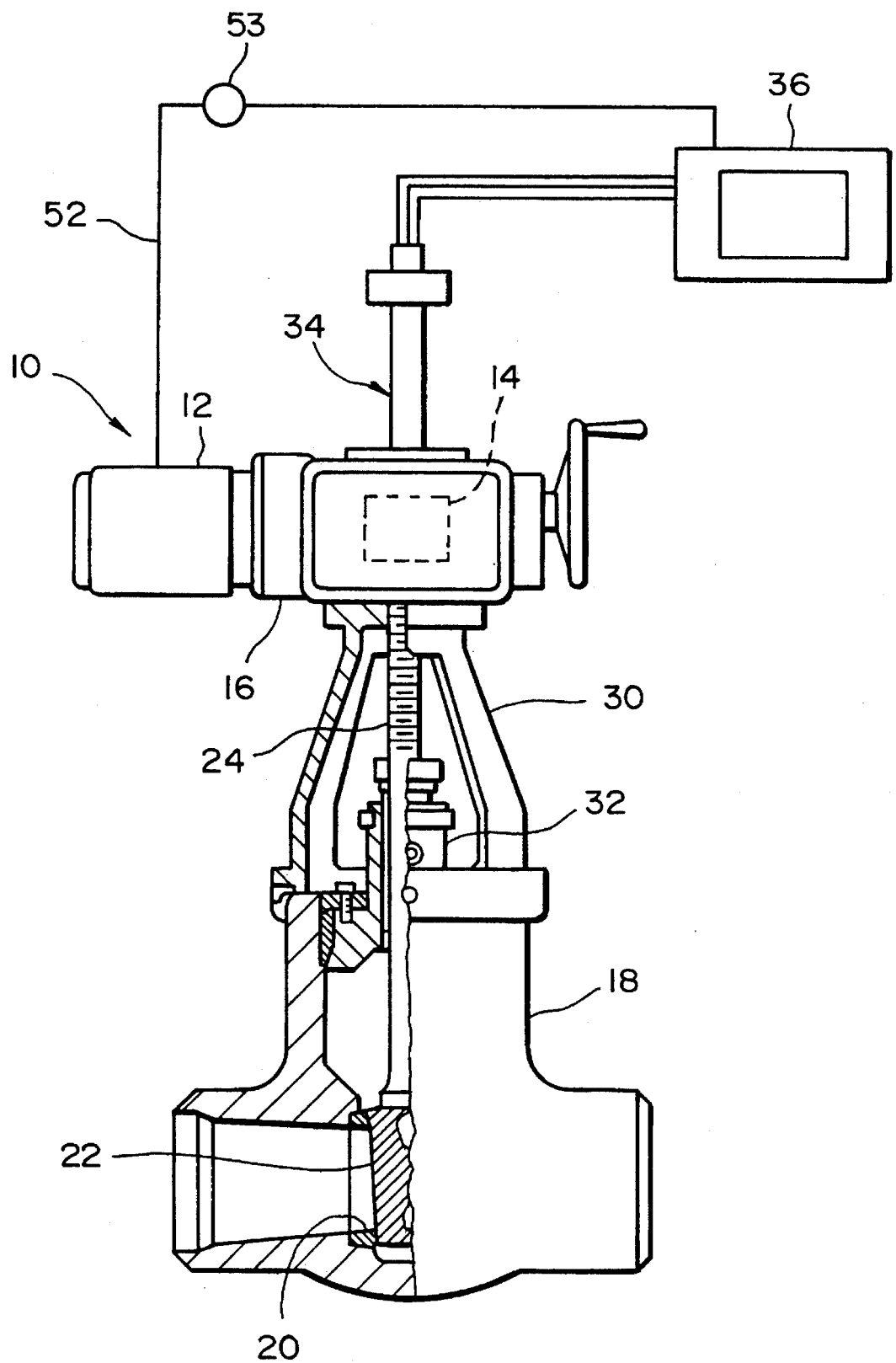
FIG. 1 is a side elevation view, partially cut-away and in section, of a typical motor operated gate valve employing the monitor system of the present invention.
Figure 2:
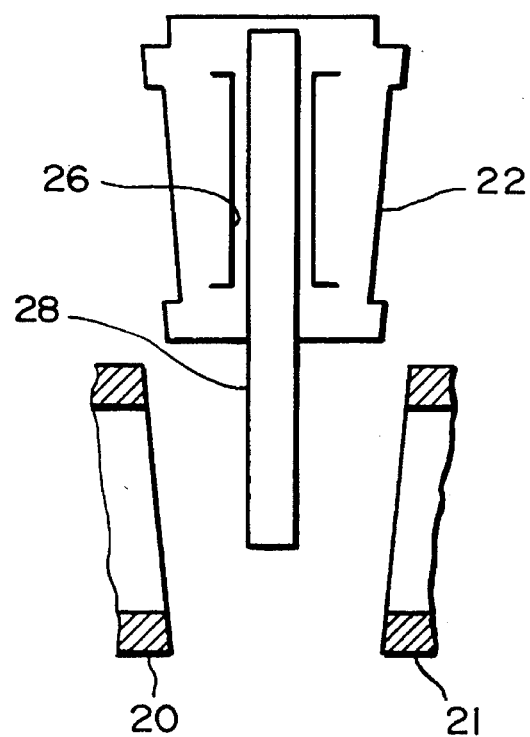
FIG. 2 is an enlarged side elevation view of the valve element and associated valve seats and guides of the motor operated gate valve of FIG. 1.

Referring to FIGS. 1 and 2, a typical motor operated gate valve 10 includes a motor 12 which imparts rotary motion in a stem nut 14 through a gear box 16. The stem nut 14 is free to rotate but constrained from translating. A valve housing 18 is adapted to be fitted in a flow stream or pipe line (not shown) and has a pair of aligned valve seats 20 and 21.

A valve element 22 is connected to one end of a valve stem 24. The upper end portion of the valve stem 24 threadedly engages the stem nut 14. A pair of guide slots 26, of which only one is shown in FIG. 2, are provided on the opposite lateral sides of the valve element 22. A pair of guide bars 28, of which only one is shown in FIG. 2, are formed on the inner surface of the valve housing 18. The guide bars 28 cooperate with the guide slots to guide the valve element 22 as it translates up and down.

The motor 12, stem nut 14 and gear box 16 are supported above the valve housing 18 on a yoke 30. A packing 32 seals the valve housing 18 while permitting the valve stem 24 to translate up and down during opening and closing movements of the valve element 22. Opening and closing movements are effected by rotating stem nut 14 with the motor 12 and gear box 16. As the stem nut 14 rotates, the valve stem 24 and attached valve element 22 are caused to translate up and down, depending on the direction of rotation of the stem nut 14.

The valve element 22 and stem 24 are constrained from rotating by the guide slots 26 and guide bars 28, although a small amount of rotation will occur under certain circumstances. For example, clearances between the guide slots 26 and guide bars 28 lead to stem rotation. Also, some movement can be detected at the "T-bar" connection between the valve element 22 and the end of the valve stem 24. According to the present invention, measurement of the stem rotation during operation of the valve provides valuable data on the wear and functioning characteristics of the valve.

In order to measure stem rotation, a sensor 34 is operatively coupled to the valve stem 24 to provide a signal indicative of the amount of valve stem rotation. The signal is fed to a monitor 36 which produces a visual display of the signal. In one embodiment, the monitor is an oscilloscope which produces a signal trace. Other signal analyzers can be used, such as an FFT spectrum analyzer. Alternatively, the sensor 34 may be any device capable of measuring stem rotation, including a simple mechanical pointer. One preferred type of sensor 34 is a potentiometer or other transducer which is capable of measuring angular rotation.

Figure 4:
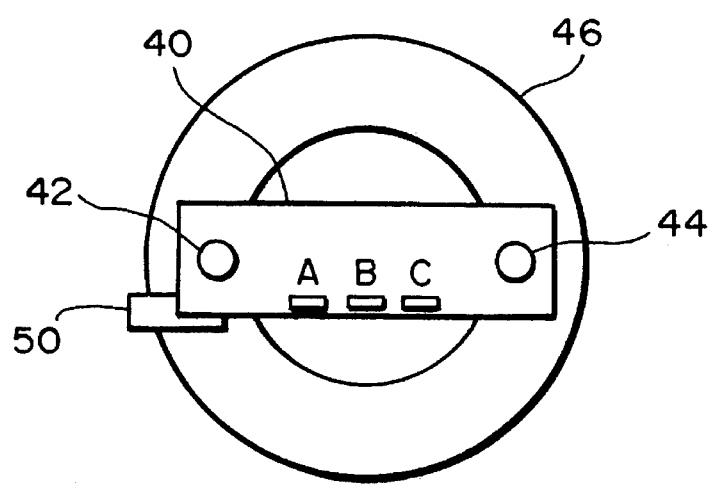
FIG. 4 is a top view of the sensor of FIG. 3.
Figure 3:
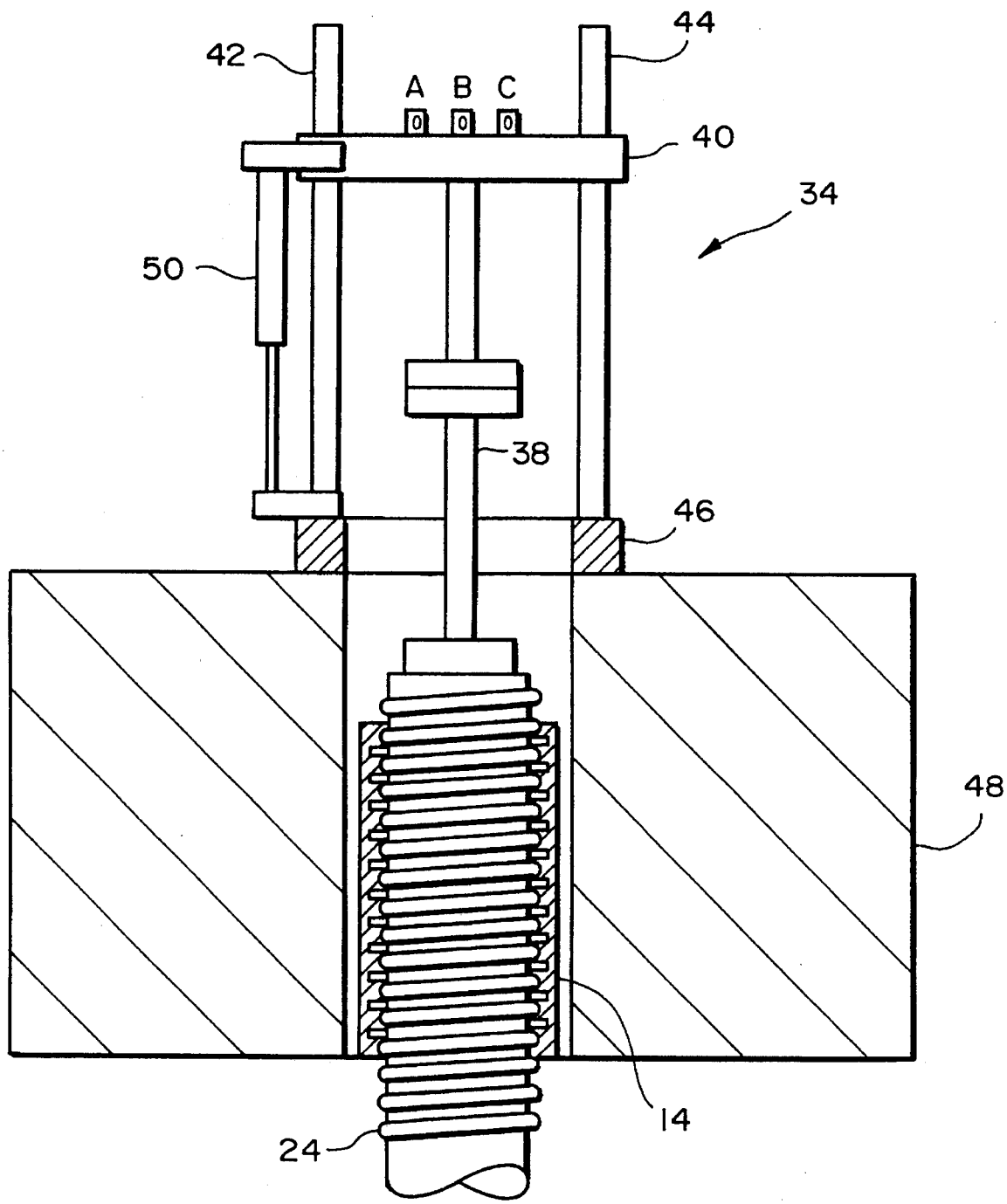
FIG. 3 is a schematic side elevation view, partially in section, showing a preferred sensor for measuring valve stem rotation according to the present invention.

As seen in FIGS. 3 and 4, the sensor 34 is an angular displacement transducer having a stem 38 connected to the valve stem 24. Connection of the transducer stem 38 to the valve stem 24 can be accomplished using any suitable means, such as threaded engagement, magnetic fasteners, or other couplers. It is not unusual for the valve stem 24 to have a prefabricated tapped bore in the distal end provided by the valve manufacturer. Thus, the transducer stem 38 can be threaded to engage the tapped bore of the valve stem 24, thereby connecting one to the other. When so connected, the transducer stem 38 rotates with the valve stem 24. The range of rotation under normal conditions is between 0°–15°. A transducer base 40 is mounted on a pair of vertical guides 42 and 44 which permit vertical translation of the base but prevent rotation. The guides 42 and 44 are mounted on a support 46 which is fixedly connected to the valve operator structure 48 of the valve 10.

When the valve stem 24 rotates and translates, the transducer stem 38 rotates and translates, but the transducer base 40 only translates. The change in rotational angle can be measured, in the case where a potentiometer is used, by applying a fixed voltage across leads A and C and measuring the change in voltage between either leads A and B or leads B and C.

Linear position of the valve stem 24 can be determined by adding a linear variable displacement transducer 50. Other suitable sensors can be used to provide data on linear displacement of the valve stem 24. The simultaneous measurement of both rotational angle and linear position provides easy reference to internal clearances at any given linear position. For example, any valve guide aberrations could be seen by plotting angular vs. linear position.

Figure 5:
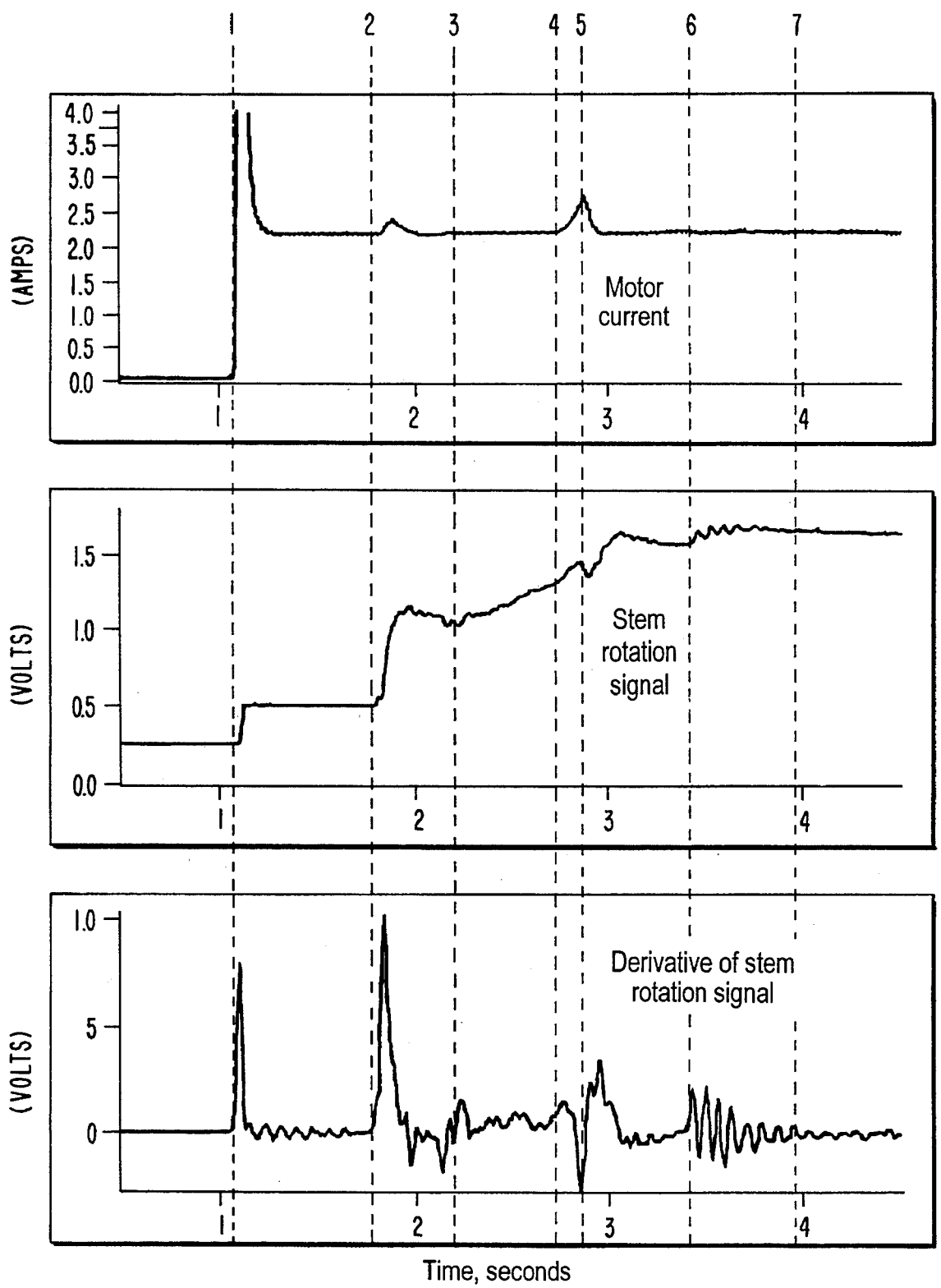
FIG. 5 shows signal traces of motor current, stem rotation, and rotation derivative, during gate valve unseating.

FIG. 5 shows the motor current signal, provided to the monitor 36 along line 52, as seen in FIG. 1, the stem rotation signal, as provided by the sensor 34, and the derivative of the stem rotation signal during gate valve unseating. The derivative can be computed by a processor contained in the monitor 36. The motor current can be measured directly by an ammeter 53.

When the valve is opened, a sequence of events occurs which result in changes in valve stem rotation. These changes are visualized in FIG. 5 as the valve element is moved from its seat to partially open. Just after point (1) the motor is energized and the motor inrush current goes offscale. Within about 0.05 seconds the valve stem can be seen to rotate. At this point, the motor and associated gearing has not yet begun to cause the stem to move. Instead, the stem is rotating due to the relief of the residual force that had been applied to the stem through the stem nut. This force was transmitted to the disk through the T-bar connection which provides the connection between the valve stem and the valve element or disk, when the valve disk was driven into the seat during the previous closing stroke.

Less than 1 second after initial stem movement associated with the relief of the compressive force, hammerblow begins to occur at point (2). The hammerblow releases additional residual force, allowing the stem to further rotate. At this point the stem still has not been lifted by the motor turning; rather, the stem movement has been the result of the release of stored energy.

As the stem nut begins to rotate, its thread engagement with the valve stem transfers from the topside of the stem threads (as existed when the valve was shut) to the bottom side of the stem threads, resulting in upward motion of the stem. Unlike the previous motion, which was due to the release of stored energy, this motion results from the motor actually pulling the stem upward. The accompanying stem rotation occurs beginning at point (3) where the stem starts to move through the packing. As the stem is rotated and raised, the T-bar, which is the interface connection between the stem and the valve disk, rotates and rises (between points (3) and (4)) to the point where it engages with the top side and lateral surfaces of valve element T-bar slot. When the contact occurs, and the stem begins to pull on the valve element at point (4) the rate of the stem rotation (slope of the rotation curve, as given by the derivative) increases due to the increased loading. As the stem applied force overcomes the static frictional force and the valve "pops" free, at point (5), the motor current peaks. The stem rotation rate then immediately drops. At point (6) the gate grabs slightly as it completely departs the seat area. As the valve clears the seat area, the stem further rotates slowly until it is constrained by the disk to disk guide interface at point (7), at which time the rotation ends.

Figure 6:
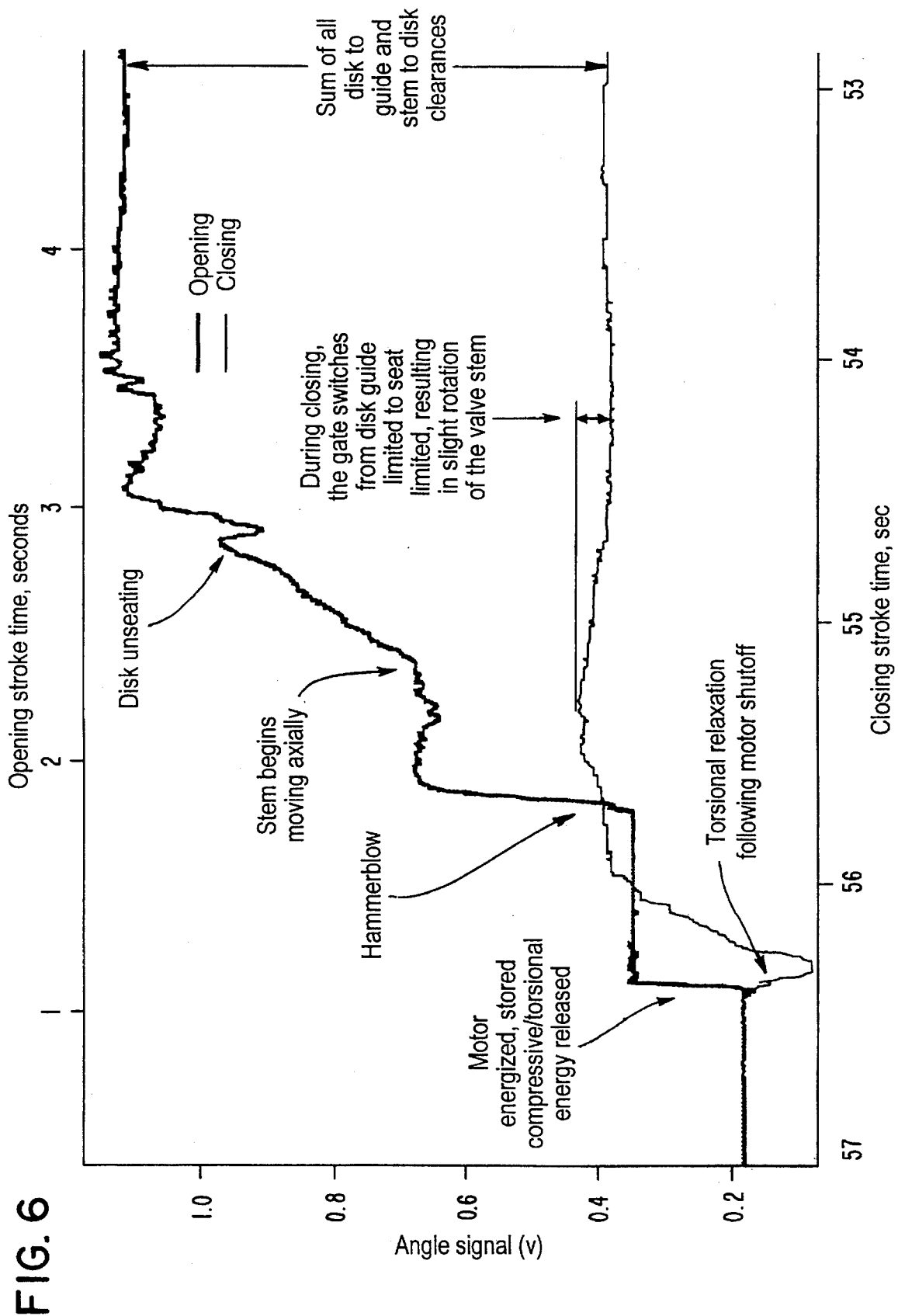
FIG. 6 shows the rotational signal only in both directions of valve movement near the seat.
Figure 7:
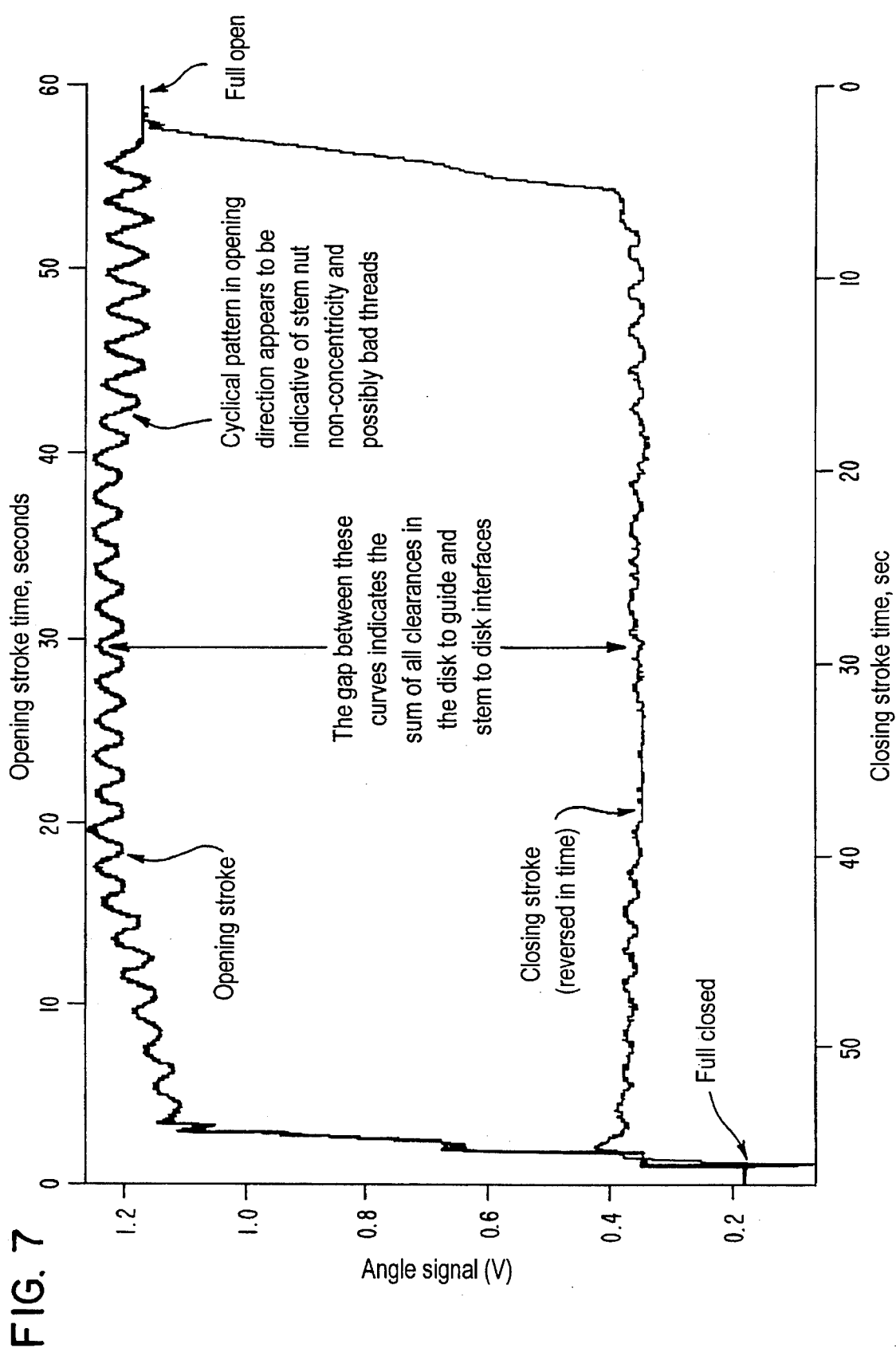
FIG. 7 shows the rotational signals from valve movement in both directions over the full stroke.

FIG. 6 shows the rotational signal only in both directions of valve movement near the seat. FIG. 7 shows the rotational signals from valve movement in both directions over the full stroke. As seen in FIG. 7, the gap between the opening stroke curve and the closing stroke curve indicates the sum of all clearances in the disk to guide and stem to disk interfaces. A base line trace can be determined for a normal valve. A widening gap can then indicate wearing of parts, as manifest in larger clearances in the interfaces.

From the Figures described above it can be seen that the combination of motor current and stem rotational angle provide unique insights into the whole picture of events occurring during valve opening and closing operations. Thus, the present invention can be used to provide information on valve operation as well as valve wear. In other words, a signal trace for a given valve provides information on the different sequence of events occurring during opening and closing; changes in the signal trace over time can be correlated to valve wear. Also, the total compressive load is evidenced by the torsional relaxation up to the time that the valve stem begins to move axially. Increased thrust delivered to the valve disk as it is driven into the seat results in larger rotation from motor start to point (3). This has been demonstrated by varying the valve torque switch setting and observing changes in stem rotation. It is expected that the extent of rotation can be closely related to delivered thrust.

Figure 8:
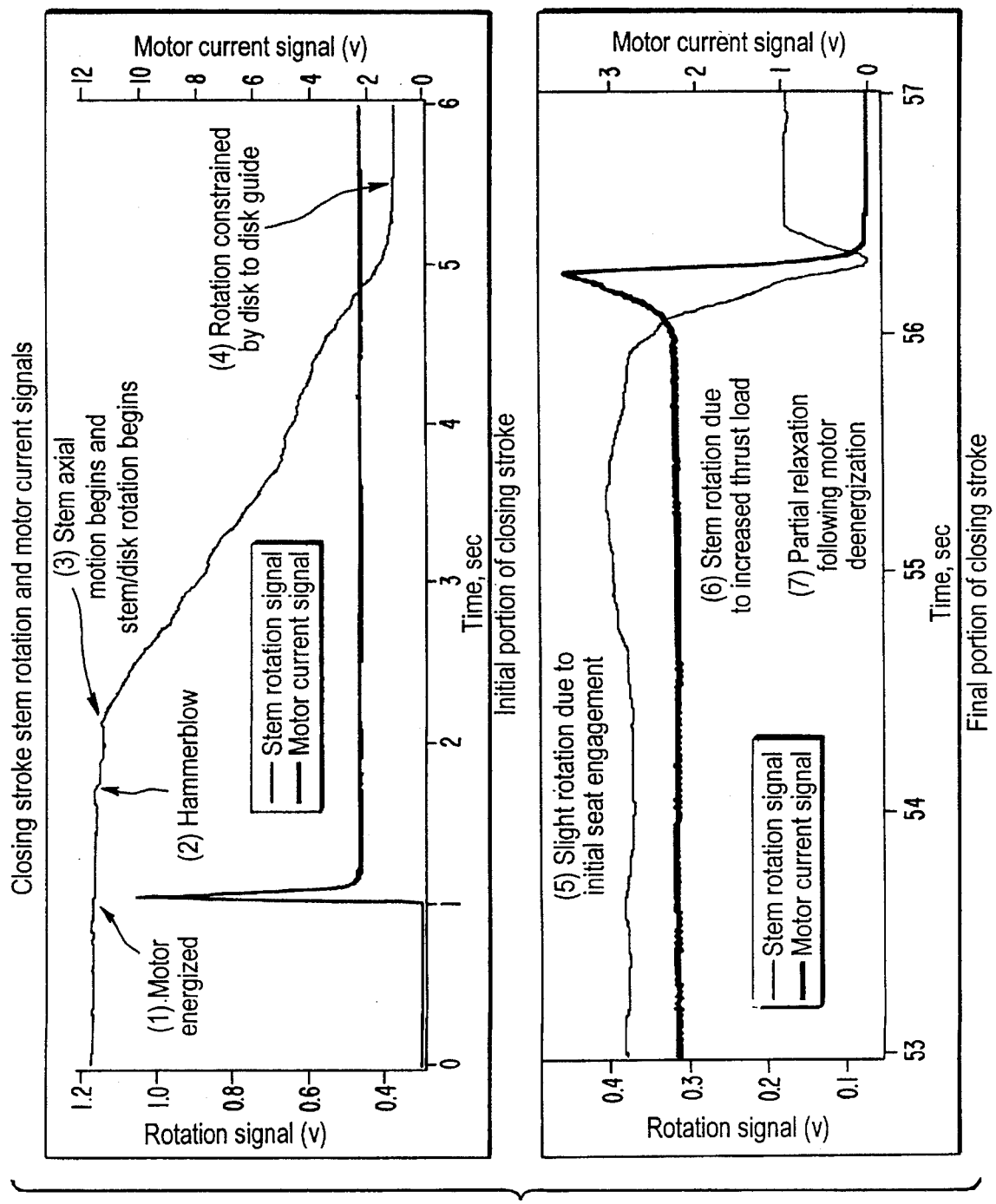
FIG. 8 shows signal traces of motor current and stem rotation during the initial few seconds and final few seconds of valve closing.

As seen in FIG. 8, additional features of the valve can be seen during closing. When the motor is energized at point (1) only a small amount of stem rotation is observed, due to the low level of residual forces. At point (2), the stem nut begins to turn and further relieves the stem residual forces remaining from the opening stroke, resulting in additional stem rotation. At point (3), the valve stem begins to be driven, as can be seen by the rotation of the stem, as well as by the slight increase in motor loading (associated with packing friction). At point (4) stem rotation is constrained by the disk to disk guide interface. Between points (3) and (4) the T-bar to disk and the disk to disk guide clearances are taken up by stem rotation. At point (5) a slight rotation of the stem angle can be seen. This is due to the disk beginning to move into the seat area. As the disk further enters the seat, thrust forces increase dramatically, resulting in increased motor load and stem rotation at point (6). At point (7) the valve is fully seated and the motor has been deenergized by the opening of the motor torque switch.

According to the present invention, the magnitude, slope, time duration, frequency and other parameters of the stem rotation signal alone, or in conjunction with other valve diagnostic information, can be correlated to various dimensional clearances and mechanical loads.

The invention is thus capable of providing in a non-intrusive manner critical valve dimensional and clearance information which is not available from any other means except through disassembly and measurement. The fact that the measurements could be made without requiring disassembly is of extreme importance, since many of the valves of interest are located in contaminated systems, as well as the fact that the valves provide safety-related functions which would not be available during disassembly. The ability to monitor the valve's dimensions non-intrusively will permit plant maintenance personnel to quickly, and with minimal impact on plant operations, determine valve condition, thereby assuring continuing valve reliability.

Also, as noted above, the present invention can be used to measure thrust loads. Although other means of measuring thrust loads exist, such as the use of strain gauges attached to the valve yoke, there are inherent difficulties in the use of the devices, such as the necessity of ensuring proper location to avoid torsional loads, problems associated with hydraulic loading of the body, and temperature related problems associated with strain gauges. These difficulties can be avoided by direct measurement of valve stem torsion.

The present invention can be applied to any gate valve, regardless of the type of valve operator. It is also anticipated that it could potentially be applied, at least partially, to other valve types, such as globe or butterfly valves. It should be noted that gate valves comprise the bulk of isolation valves used in the nuclear power industry. Various other valves that do not rely on rotatable stem nuts for actuation can also be analyzed using the methodology and system of the present invention. For example, pneumatically actuated valves, or other valves having fluid drives, can be analyzed by turning the valve stem by hand. In this case, torque is applied to the valve stem when the valve element is not being driven for translatory motion. Valve clearances between the valve element and its guides, and/or between the stem and the element at the T-bar joint, will result in stem rotation when torque is applied to the stem. The amount of rotation can be correlated to an amount of wear.

The measurement of stem rotation does not have to be done electronically. A simple mechanical indicator can be devised which would turn with the valve stem, yet remain horizontally positioned. Such a device could be keyed to the stem to turn therewith, while permitting the stem to pass freely therethrough during translation of the stem. The amount of rotation can be read from the simple mechanical device, and then a technician can refer to a chart to correlate the amount (in degrees) of stem rotation to an amount of valve wear. Thus, it is necessary to establish a baseline of rotation for each valve to be tested, so that the measured rotation can be compared to the baseline.

When using the simple mechanical indicator, the valve can be actuated by hand, or by motor, to various positions. From these positions, torque can be applied to the stem to determine the amount of rotation at each position. If the motor is used to actuate the valve element to move between open and closed positions, torque can not be applied to the valve stem while the stem is translating. However, when the motor is stopped, the stem can be turned by hand (or by a suitable tool) to determine the amount of rotation at selected positions.

While advantageous embodiments have been chosen to illustrate the invention, it will be understood by those skilled in the art that various changes and modifications can be made therein without departing from the scope of the invention as defined in the appended claims.

What is claimed is:

1. A system for determining operative conditions of a valve having a valve element connected to a threaded valve stem translatable by threaded engagement with a rotatable drive member to move the valve element between open and closed positions, said threaded valve stem being generally constrained from angular movement by engagement with guide means, the system comprising:

means for measuring absolute rotation of the valve stem during rotation of the rotatable drive member; and means for correlating the measured absolute valve stem rotation to at least one operative condition of the valve.

2. A system according to claim 1, wherein the valve stem is driven for translatory motion by a rotatable stem nut, and the measuring means includes first sensor means for producing a signal indicative of valve stem rotation, and monitor means, coupled to receive the signal from the first sensor means, for indicating changes in the valve rotation signal, said changes corresponding to different operative conditions of the valve.

3. A system according to claim 2, wherein the monitor means includes an oscilloscope capable of producing a signal trace of the first sensor means based on voltage which changes over time, and means for computing a derivative of the signal trace.

4. A system according to claim 2, wherein the first sensor means is an angular displacement transducer.

5. A system according to claim 4, wherein the angular displacement transducer is a potentiometer having a stem connected to the valve stem to be rotatable therewith.

6. A system according to claim 5, wherein the range of rotation of the valve stem is 0°–15°.

7. A system according to claim 5, wherein the potentiometer further includes a transducer base mounted on vertical guide means for permitting vertical translation of the base while preventing rotation.

8. A system according to claim 7, wherein the guide means includes at least one vertical guide mounted on the valve.

9. A system according to claim 2, wherein the valve includes a motor.

10. A system according to claim 9, further comprising second sensor means for producing a signal indicative of motor current during operation of the valve, the signal of the second sensor means being coupled to the monitor means.

11. A system according to claim 10, wherein the second sensor means is an ammeter.

12. A system according to claim 10, further comprising third sensor means for producing a signal indicative of linear displacement of the valve stem.

13. A system according to claim 12, wherein the third sensor means is a linear variable displacement transducer.

14. A method for determining operative conditions of a valve having a valve element connected to a threaded valve stem translatable by threaded engagement with a rotatable drive member to move the valve element between open and closed positions, said threaded valve stem being generally constrained from angular movement by engagement with guide means, the method comprising the steps of:

measuring absolute valve stem rotation during rotation of the rotatable drive member; and correlating the measured valve stem rotation to at least one operative condition of the valve.

15. A method according to claim 14, wherein the measuring step comprises applying torque to the valve stem and measuring the amount of stem rotation resulting from said torque.

16. A method according to claim 14, wherein the valve includes a stem nut rotatably driven by a motor to impart translatory motion in the valve stem, and the measuring step includes powering the motor and measuring stem rotation during translational movement of the valve element.

17. A method according to claim 16, further comprising measuring motor current during translational movement of the valve element.

18. A method according to claim 17, wherein the step of measuring motor current comprises producing a signal indicative of motor current.

19. A method according to claim 14, wherein the measuring step comprises producing a signal indicative of valve stem rotation with first sensor means and the correlating step includes comparing the signal of the first sensor means to a baseline value indicative of a nodal valve operative condition.

20. A method according to claim 14, further comprising measuring linear displacement of the valve stem during opening and closing operations of the valve element.

21. A method according to claim 20, wherein the step of measuring linear displacement comprises producing a signal indicative of linear displacement of the valve stem, whereby internal clearances of the valve element are determined as a function of measured stem rotation and translation.

22. A method for determining operative conditions of a valve having a valve element connected to a valve stem, said valve stem being translatable to move the valve element between open and closed positions, the method comprising the steps of:

measuring valve stem rotation and correlating the measured valve stem rotation to at least one operative condition of the valve; and measuring linear displacement of the valve stem during opening and closing operations of the valve element by producing a signal indicative of linear displacement of the valve stem, whereby internal clearances of the valve element are determined as a function of measured stem rotation and translation.

* * * * *